United States Patent [19]
Lohmann et al.

[11] Patent Number: 6,133,372
[45] Date of Patent: Oct. 17, 2000

[54] AQUEOUS POLYMER DISPERSION, PROCESS FOR PREPARING THE SAME AND ITS USE IN LEATHER PRODUCTION

[75] Inventors: Helmut Lohmann, Krefeld; Thomas Müller, Meerbusch; Waldemar Inger; Stephan Ramlow, both of Krefeld, all of Germany

[73] Assignee: Stockhausen GmbH & Co. KG, Krefeld, Germany

[21] Appl. No.: 09/147,437

[22] PCT Filed: Jun. 26, 1997

[86] PCT No.: PCT/DE97/01365

§ 371 Date: Dec. 23, 1998

§ 102(e) Date: Dec. 23, 1998

[87] PCT Pub. No.: WO98/00448

PCT Pub. Date: Jan. 8, 1998

[30] Foreign Application Priority Data

Jun. 28, 1996 [DE] Germany ............. 196 25 984

[51] Int. Cl.⁷ .................. C08K 5/41; C08F 2/24; C14C 9/00; C14C 3/12; C14C 3/22
[52] U.S. Cl. ............. 524/745; 524/742; 524/747; 526/81; 526/82; 526/234; 8/94.1 R; 8/94.23; 252/8.57
[58] Field of Search .................. 524/745, 742, 524/747; 8/94.1 R, 94.23; 526/81, 82, 234; 252/8.57

[56] References Cited

U.S. PATENT DOCUMENTS

| | | |
|---|---|---|
| 3,408,319 | 10/1968 | Rau . |
| 3,591,541 | 7/1971 | Athey et al. ............ 524/745 |
| 4,054,716 | 10/1977 | Toepfl . |
| 4,134,867 | 1/1979 | Toepfl . |
| 4,590,236 | 5/1986 | Koenig et al. . |
| 5,115,013 | 5/1992 | Roettger et al. . |
| 5,316,860 | 5/1994 | Stewart et al. . |
| 5,387,640 | 2/1995 | Michels et al. . |
| 5,620,748 | 4/1997 | Birkhofer et al. ........... 8/94.23 |

FOREIGN PATENT DOCUMENTS

| | | |
|---|---|---|
| 0 498 634 | 8/1992 | European Pat. Off. . |
| 0 552 630 | 7/1993 | European Pat. Off. . |
| 0 701 020 | 3/1996 | European Pat. Off. . |
| 29 26 103 | 1/1981 | Germany . |
| 33 44 354 | 6/1985 | Germany . |
| 41 27 571 | 2/1993 | Germany . |
| 41 38 791 | 5/1993 | Germany . |
| 42 23 111 | 1/1994 | Germany . |
| 42 24 456 | 1/1994 | Germany . |
| 42 27 974 | 3/1994 | Germany . |
| 42 42 039 | 6/1994 | Germany . |
| 321 113 | 6/1957 | Switzerland . |
| 329 052 | 5/1958 | Switzerland . |
| 1 337 084 | 11/1973 | United Kingdom . |
| WO 93/05188 | 3/1993 | WIPO . |
| WO 94/01587 | 1/1994 | WIPO . |

OTHER PUBLICATIONS

S. Mueller, et al., Angewandte Makromolekulare Chemie 204, 1993–05187, 1993.

WSCA Abstract, Ref. 421781, JP 05 214 676.

Paperchem2 Abstract, Ref. 81:2106, CS 181533, Feb. 15, 1980.

Caplus Abstract, Ref. 1982:546507.

*Primary Examiner*—Tae Yoon
*Attorney, Agent, or Firm*—Oblon, Spivak, McClelland, Maier & Neustadt, P.C.

[57] ABSTRACT

Aqueous polymer dispersions are produced by polymerizing monoethylenically unsaturated monomers bearing acid groups in an acid, partially or totally neutralized form, optionally with other monomers that can be copolymnerized therewith in the presence of hydrophilized vegetable, animal and/or synthetic fats or oils. Also disclosed is a process for preparing the same, their use for preparing oil-in-water emulsions by admixture of another oil phase composed of vegetable, animal or synthetic oils and/of fats and/or non-self-emulsifying silicones, and their use in the field of wet currying of leather or pelts.

27 Claims, No Drawings

AQUEOUS POLYMER DISPERSION, PROCESS FOR PREPARING THE SAME AND ITS USE IN LEATHER PRODUCTION

The present invention relates to aqueous polymer dispersions obtainable by polymerizing monoethylenically unsaturated, acid groups-containing monomers in acid, partially or completely neutralized form, optionally further monomers copolymerizable therewith, in the presence of hydrophilized vegetable and/or animal and/or technical fats or oils. The present invention further relates to a process for their production, their use in the production of oil-in-water emulsions by adding a further oil phase which is formed of vegetable, animal or technical oils and/or fats and/or non-self-emulsifying silicones, their use in manufacturing leather and fur skins, and to leather and fur skins produced by means of these agents.

In leather manufacturing the use of acid groups-containing polymers is known to achieve special leather properties. There are several publications relating to the use of hydrophilic, water-soluble polymers in the so-called retannage. In this connection, achieving a full additional tannage is of minor importance; the aim is rather an improvement of different leather properties, such as tensile strength, fullness, levelness of color, or grain pattern. DE 42 27 974 A1 of applicant and the literature cited therein represent examples for this field.

For some time now, special polymers have increasingly been used in fatliquoring or waterproofing of leather. In general, these products are water-dispersible, amphiphilic polymers such as those described in EP 372 746. Although these products are said to have retanning properties, they are mostly insufficient when used alone. On the other hand, to obtain particularly soft leather types, it is frequently also necessary to use additional conventional fatliquors known to the skilled artisan.

In this connection, it would be desirable to combine fatliquors and retanning polymers in one product. Practice has shown that these formulations frequently result in intolerances leading to unstable, phase-separating products.

DE-OS 14 94 858 (priority: U.S. Pat. No. 3,408,319) describes tanning materials produced by copolymerizing a) 80–90% acrylic acid, methacrylic acid, or mixtures of both and b) 10–20% sulfation products of vegetable or animal oils, wherein the oil component must contain double bonds. Copolymerization is conducted such that fat component and water are charged into the reactor and heated to about 90° C. After that, initiator and optionally chain-transfer agents are metered over a longer period of time. Finally, neutralization is effected. The aqueous solutions thus produced are used in solo or combination tannage of hides, and they are to avoid cracking of the leather grain. Using such products in wet end finishing is not described.

EP 24 886 describes a process for the tannage of leather. In a first step the hide prepared in usual manner is treated with a polymer dispersion of methacrylic acid, acrylic acid, and optionally sulfated unsaturated oils (according to U.S. Pat. No. 3 408 31 9), such as sulfated castor oil. This is followed by a treatment with a mineral tanning agent, for example, a zirconium component. In this manner, very rigid, hard leathers are obtained which are suitable as sole leather, for example. In this case, a use in wet end finishing is not mentioned either.

EP 332 342 describes a process for preventing the deposition of dyes from soil components on polyamide materials. In this process the polymers already mentioned in EP 24 886 are used.

In Leather Science, vol. 25 (1 978), pages 22–33 and pages 507–512, E. P. Kaniappan et al. describe the production of copolymers of acrylic monomers, in particular methacrylic acid and sulfated castor oil, and their use in leather manufacture. Polymerization is carried out by charging the fat component and water and metering the monomer and initiator at a temperature of 80° C. Here, it is expressly pointed out that castor oil was chosen for the examinations because—owing to the chemical structure—it still had double bonds even after sulfation and could therefore be copolymerized. IR-spectroscopy proved that the absorption bands of the double bonds had disappeared after copolymerization. However, this also means that the mobility of the fat component is limited since it is bound to the polymer body. For this reason, the penetration depth into the leather of these actually good fatliquors is restricted.

DE 42 24 456 describes water-soluble or water-dispersible graft polymers of vegetable or animal oils. They are produced by radical polymerization of a) 20 to 100% monoethylenically unsaturated carboxylic acids and/or monoethylenically unsaturated sulfo acids and/or monoethylenically unsaturated phosphonic acids or their alkali, alkaline earth, or ammonium salts, b) 0 to 80%-wt. of further ethylenically unsaturated monomers which are copolymerizable with the monomers according to a), and c) 0 to 5%-wt. of at least doubly ethylenically unsaturated, non-conjugated monomers, in the presence of vegetable and/or animal oils, the ratio of monomers to graft basis amounting to 80:20 to 1:99. According to the embodiment examples, polymerization reaction takes place in an inert gas atmosphere without solvents or dispersing agents at about 150° C. The fat component combined with the initiator is subjected to a preliminary reaction first, and the monomers are added later; or the fat component is initially introduced and then monomer and initiator are metered. Metering the monomers is preferable. These products may be used to fatliquor and fill leather. According to the statements in this publication, the use of partially sulfated fats and oils is not recommended because they destroy the water-repellent properties of a waterproof leather, inter alia, owing to the large portion of polar groups. The production examples show that the emulsions according to that invention form after polymerization only by means of intense stirring at a high shearing action (Ultra-Turrax).

According to applicant's experience, these products, particularly in case of higher oil contents, tend to separate in case of insufficient grafting and components not reacting with each other, so that either additional emulsifiers or drastic reaction conditions must be used to achieve a high level of grafting. However, both methods involve disadvantages: the use of emulsifiers, for example, may destroy the water resistance of waterproof leathers, on the other hand, the disadvantages connected with rigorous reaction conditions (high reaction temperatures, long reaction times, large amount of by-products) are not desirable for economical and ecological reasons.

EP 606 064 A2 discloses copolymers consisting of 1–99%-wt. (meth)acrylic acid and 99–1 %-wt. ethylenically unsaturated fatty acid derivatives, preferred derivatives being esters, amides, or nitriles. The copolymers are produced in mass or nonaqueous solvents under inert gas with organic peroxides at temperatures of preferably 100–180° C.; after that they are used in aqueous emulsion as sole fatliquor for leather. The copolymers may also be used as oiling emulsifiers for vegetable and/or animal fats, oils and/or waxes. However, like in DE 42 24 456, these products are difficult to produce because of the required high temperatures, heavy power expenditure and limited storage stability.

It was accordingly the object of the present invention to provide suitable combinations of fat component and polymer that overcome the shown disadvantages with respect to production and stability and are additionally capable of emulsifying a certain additional content of hydrophobic substances, such as paraffins, fats, oils, and in particular water-insoluble silicones, in a stable condition without expensive processing steps and without additional emulsifiers.

Most surprisingly it turned out that the polymerization in aqueous solution or dispersion of monoethylenically unsaturated, acid groups-containing monomers in acid, partially or completely neutralized form and optional further monomers copolymerizable therewith, in the presence of hydrophilized vegetable and/or animal and/or technical fats or oils, provides aqueous polymer dispersions achieving said object.

A particularly surprising fact was that—despite relatively mild reaction temperatures—very stable, finely divided, concentrated emulsions, which proved to be superior to prior art products in application tests, could always be obtained when the fat component and at least the major part, preferably the whole amount of monomers were initially introduced at the beginning of the polymerization. The primary surprise was that using the hydrophilized fats and oils—in contrast to statements in the art—did not result in reduced hydrophobic properties of the leathers and furs. Equally surprising was the finding that it is possible according to the present invention to do without the usually highly unsaturated oils, such as castor oil, and to use saturated or slightly unsaturated fats as parent substance. This is important with respect to light and heat stability of the treated leathers.

The emulsions according to the present invention are excellently suitable to emulsify hydrophobic substances, such as paraffins, triglycerides of vegetable and/or animal origin, and/or silicones. The hydrophobic substances may be used in an amount of up to 40%-wt., relative to the total resulting emulsion. The oil-in-water emulsions forming through minimum stirring stand out for a very good storage stability and can advantageously be used in fat liquoring or retanning of leather and fur skins.

Hydrophilizing the oils and fats may be effected in different ways. In principle, any reaction incorporating polar functional groups into a fat body is suitable. Preferred starting materials include saturated and unsaturated fats and oils of animal and/or vegetable origin, such as fish oil, neatsfoot oil, coconut oil, lard oil, palm oil, beef tallow, castor oil, sunflower oil, animal fats, etc.

It is also possible to use for this reaction technically obtainable $C_{12}$–$C_{30}$ hydrocarbons or hydrocarbon mixtures.

$C_{12}$–$C_{30}$ fatty acids, such as lauric acid, myristic acid, palmitic acid, stearic acid, or oleic acid, which are obtainable after saponification of native fats and oils are also suitable. Usually, their hydrophilicity is still insufficient to provide stable emulsions after terminated polymerization, particularly in case of longer carbon chains.

Also, fatty alcohols and fatty amines or technical mixtures obtained from natural fatty acids or, in the case of Ziegler-alcohols, produced by the so-called "building-up reaction" have an insufficient hydrophilicity and are therefore suitable starting materials.

As mentioned above, there are several hydrophilizing possibilities, most of them are already in industrial use.

A preferable alternative is hydrophilizing by sulfonation, sulfitation or sulfation. In these cases, the fatty components are reacted with sulfur-containing compounds, for example, sulfuric acid, chlorosulfuric acid, or oleum, and the reaction products are neutralized with aqueous lye. In these processes sulfate or sulfonate groups are incorporated into the fat molecule. Depending on the degree of reaction, more or less stable emulsions form with water. Tests have shown that the product separates into two phases after a short while, even if the stable fat emulsion and the polymer solution are mixed intensely. On the other hand, it is possible by means of the present invention to obtain stable end products with fat emulsions that are unstable as such. However, for the use according to the present invention it is preferable to use those products wherein the organically bound $SO_3$ quantity amounts to at least 0.5%.

Another reaction to hydrophilize fatty components is phosphation wherein the educts are reacted with reactive phosphorus components, such as phosphorus pentaoxide. For this reaction it is preferable to use fatty alcohols or fatty amines which then react to the corresponding phosphoric acid esters or amides.

An oxidation, preferably by using suitable catalysts, provides the introduction of hydroxy and/or carboxyl groups into hydrocarbons, and it may therefore also be suitable as a basis for the production of the polymer dispersions according to the present invention.

Equally suitable is an alkoxylation with epoxides, such as ethylene oxide, propylene oxide, and/or butylene oxide; this is for example described in Tenside 3 (1966) 2, 37.

All described operations for hydrophilizing the fat or oil component correspond to the state of the art and are known to the skilled artisan. For the dispersions according to the present invention the hydrophilized fats do not necessarily have double bonds. In general, such double bonds are only incompletely reacted and may affect light and heat stability of the leather treated therewith. For this reason, products are preferably used which have an iodine number of less than 40, particularly preferred less than 20, the characteristic being determined according to DIN 53 241 part 1 and related to the fatty component used. Particularly suitable are also those components wherein a combination of the described reactions, such as alkoxylation with subsequent sulfation/sulfonation has been conducted. Such a combination is described, for example, in DE 38 26 179 C2.

The products resulting from the described chemical reactions are usually directly used for the actual polymerization. However, it is also possible to purify them in separation processes, such as extraction, distillation etc., prior to their use.

The hydrophilized fatty components are used for polymerization in such an amount that a weight ratio of monomers to hydrophilized fat component of (20 to 80):(80 to 20) is present in the end product, with the proviso that the quantities make up 100 parts by weight. In case of a lower fatty component portion, as is proposed in DE 14 94 858 for example, the technological advantage over pure polymer dispersions is generally lost, whereas the dispersing effect of the polymer is no longer sufficient to produce sufficiently stable emulsions with a content of more than 80%.

Polymerization is carried out in aqueous solution or dispersion and therefore has economical and ecological advantages over polymerization processes in nonaqueous medium.

According to the present invention, the reaction is carried out by an adiabatic procedure wherein initiation is effected at a low temperature and the resulting reaction heat provides a temperature increase. The starting temperatures normally range between 0 and 40° C., preferably between 10 and 30° C. Depending on the monomer concentration in the adiabatic polymerization batch, the starting temperature may be lower or higher. High monomer concentrations in the polymerization batch result in higher end temperatures than low monomer concentrations; in general it ranges between 50 and 100° C. If high temperatures are to be avoided, this may partly be corrected by a low starting temperature of clearly below 20° C. Lower starting temperatures frequently also result in increased molecular weights of the polymers.

According to another embodiment of the present invention, which may be carried out with higher-concentrated batches or with polymers having high monomer portions, the fatty components and the major part of the monomers are introduced first and the polymerization reaction is started. When the maximum temperature resulting from the polymerization heat is achieved, it is then possible to continue the reaction, for example, isothermally. The temperatures are in the range of 40 to 130° C., preferably between 50 and 110° C. The remaining monomers of the batch are added to the mixture to be polymerized, either continuously or batchwise, in such an amount that the polymerization is easily controllable in the desired temperature range, preferably over a period of about 1 to 10 hours. It is essential for the stability of the resulting aqueous polymer dispersions that at least 55%-wt., preferably at least 65%-wt. of the batch monomers are initially charged together with the hydrophilized fats and/or oils.

Initiation of polymerization is preferably effected by water-soluble radical-forming systems. A redox-catalytic system is preferable, in particular at low reaction temperatures. In addition, it is also possible to start the reaction by means of a thermally or photochemically induced degradation of radical-forming peroxide and/or azo compounds, the choice of the suitable system being determined by the intended reaction temperature. Particularly in an adiabatic polymerization, it may be suitable to use several initiators having different decomposition temperatures. By means of a final post-intiation the residual monomer content is reduced distinctly. It is also possible to use oil-soluble peroxide or azo compounds for polymerization; however, these mostly result in undesirably high molar weights of the polymers. For the procedure of partial monomer metering it has proved to be advantageous to meter the initiator substantially parallel in time. DE 42 24 456 A1 gives a list of initiators, initiator systems and regulators, as well as their concentrations, which can be used according to the present invention for polymerization.

Suitable acid groups-containing monomers of group a) include, for example, acrylic acid, methacrylic acid, vinyl acetic acid, maleic acid, fumaric acid, itaconic acid, vinyl sulfonic acid, methallyl sulfonic acid, 2-acrylamido-2-methylpropylsulfonic acid, 4-vinylphenylsulfonic acid, vinylphosphonic acid, as well as their mixtures or their anhydrides.

It is possible to use both the free acid and the partially or completely neutralized form. Suitable neutralization agents include alkali and/or alkaline earth hydroxides, ammonia, amines, polyamines, or amino alcohols. The preferably used monomers are acrylic acid, methacrylic acid, methallyl sulfonic acid, and 2-acryl-amido-2-methylpropylsulfonic acid, among these acrylic acid and methacrylic acid are most preferred.

According to a preferred embodiment, the monomers according to a) are used in an amount of 30 to 100%-wt., most preferably 60 to 1 00%-wt., relative to the total weight amount of the unsaturated monomers.

The monomers of group b) are used to modify the properties of the polymer, and they include any comonomer capable of co-polymerizing with the monomers of group a).

In particular when polymerization is carried out in aqueous medium, preferred ones include water-soluble, neutral, monoethylenically unsaturated monomers, for example, (meth)acrylamide, (meth)acrylonitrile, (meth)allyl alcohol, hydroxyethyl (meth)acrylate, hydroxypropyl (meth)acrylate, hydroxyalkyl polyethylene oxy(meth)acrylate, alkyl-oxypolyethylene oxy(meth)acrylate, polyethylene glycol monoallyl ether, N-vinyl acetamide, N-vinyl pyrrolidone, N-vinyl imidazole.

In addition, with respect to application properties, it is frequently advantageous to use basic monomers in the polymerization, such as dimethylaminoalkyl(meth)acrylate or dimethylaminoalkyl (meth)-acrylamide and/or their quaternized forms.

According to another preferred embodiment, monomers are used which stand out for a low water-solubility, in particular when they are solubilized by the hydrophilized fatty component which is also used. Examples thereof include $C_1$–$C_{30}$ alkyl (meth)acrylates, vinyl esters of $C_1$–$C_{30}$ carboxylic acids, or vinyl ethers of $C_1$–$C_{30}$ alcohols. The above mentioned slightly water-soluble monomers may also contribute to improving the softness and waterproofing of the leathers and furs.

The monomers according to b) or their mixtures are used in amounts of 0 to 70%-wt., preferably 0 to 40%-wt., relative to the total weight amount of the unsaturated monomers.

Polymerization may be carried out at normal and excess pressure or, in particular cases, also at underpressure. It is frequently advantageous to operate in an inert gas atmosphere under exclusion of oxygen. During polymerization thorough mixing of the reaction participants is normally ensured.

The number-average molecular weight of the obtained polymers ranges between 1,000 and 100,000 g/mol, preferably between 2,000 and 80,000, and most preferably between 4,000 and 50,000. A limiting factor for the molecular weight to be adjusted is the viscosity of the emulsion; this increases with increasing molecular weight. It should always be ensured that the emulsion remains flowable under the processing conditions, and that it does not become paste-like or even solid through an excessively high molecular weight of the polymer. The molecular weights are determined by gel permeation chromatography. According to the present invention the molar mass is controlled, i.e. increased or reduced, according to methods known to the skilled artisan, for example, by means of the reaction conditions, the kind, amount and timed metering of the initiator, the use of chain transfer agents, small amounts of branching/cross-linking monomers. Owing to their reaction possibilities, the latter are either incorporated during polymerization or subsequently reacted with the reactive groups of the polymer. Suitable branching/cross-linking monomers include, for example, at least doubly ethylenically unsaturated compounds and polyglycidyl compounds.

The solutions or dispersions according to the present invention have a solids content of 20 to 80%, preferably 40 to 70%. They may optionally be neutralized after terminated polymerization. Suitable agents for this purpose are alkali and/or alkaline earth hydroxides, ammonia, amines, polyamines, or amino alcohols. The base quantity is chosen such that an application-oriented pH of a 10% aqueous solution ranges between 3 and 10, preferably between 5 and 9. In any case, it must be excluded that pH-sensitive monomer components in the polymer are unintentionally damaged through hydrolysis or saponification.

Where saponification of the polymer's monomer components is desired, the emulsion may temporarily be set to saponification conditions known to the skilled artisan. This may become necessary, for example, when in a copolymer with vinyl ester units the ester groups are to be converted into hydrophilic hydroxyl groups.

The emulsions according to the present invention are also suitable to emulsify hydrophobic substances. Therefore, another subject matter of the present invention relates to mixtures of the emulsions with further hydrophobic substances, to their production and use. Such hydrophobic substances are formed, for example, by all of the fats and oils or their mixtures which have been mentioned as starting materials for hydrophilizing. Additionally suitable are polydimethyl siloxanes having a viscosity at 20° C. of not more than 1,000 mPas. It is also possible to use phospholipides, such as lecithin.

The other hydrophobic compounds added to the aqueous polymer dispersion total up to 60, preferably up to 40%-wt. of the weight of the aqueous polymer dispersion.

The oil-in-water emulsions according to the present invention are manufactured in a simple manner by slowly adding to the preemulsion, which has been made as described above, the additional oil phase under stirring at a slightly elevated temperature. According to a preferred embodiment, the temperature ranges between 40 and 90° C. when the oil phase is added.

When the additional hydrophobic oil phase is added and emulsified, surfactants need normally not be added to manufacture the oil-in-water emulsions according to the present invention because of the excellent emulsifying properties of the polymer emulsions. In exceptional cases, for example, in case of hydrophobic substances that are extremely difficult to emulsify, it might be necessary to add small amounts of an additional surfactant.

Optionally, water may also be added to set the active substance in the product. If the emulsion, prior to admixing the hydrophobic oil phase, has not or only partially been neutralized, neutralization may also be carried out after addition of the additional hydrophobic oil phase. Suitable agents for neutralization are alkali and/or alkaline earth hydroxides, ammonia, amines, polyamines, or amino alcohols. The amount of bases is chosen such that a pH of a 10% aqueous solution or emulsion sets to between 3 and 10, preferably between 5 and 9.

A particularly surprising fact was that very stable, finely dispersed, concentrated emulsions could be obtained which proved to be superior to prior art products in application tests. Equally surprising was the finding that both the polymer dispersions as such and when used as a component in the oil-in-water emulsions have no negative accompanying properties of surfactants, i.e., they do not deteriorate the hydrophobicity of the leather although the used hydrophilized fat components may have surface activity.

Owing to the excellent salt stability of the polymer dispersions according to the present invention they may be used in floats wherein other less stable emulsions would break and hence become ineffective because of a high salt content, whether this is caused by water quality or leather treating agents.

The emulsions according to the present invention, without or with additional hydrophobic oil phase, are suitable to treat leather and furs, for example. This is preferably carried out in aqueous float, for example, in a tanning drum. Depending on the end use, an amount of 0.1–20% active substance is used, relative to the shaved weight of the leather or dry weight of the fur skin. The products give the leather a soft, full and comfortable handle.

Further fields of application where the aqueous polymer dispersions according to the present invention may advantageously be used include fiber and textile finishing and skin protection.

The Embodiment Examples that follow are intended to illustrate but not to limit the present invention. All numerical data given in the Examples relate to weight amounts, unless stated otherwise.

EXAMPLE 1

375 pts. deionized water, 205 pts. acrylic acid, 205 pts. of a product according to example 1.3 of DE 38 26 179 C2 (iodine number 30), 0.3 pt. mercaptoethanol, and 0.01 pt. iron(ll) sulfate are initially introduced into a three-neck glass flask equipped with stirrer and cooler. Polymerization is started at 20° C. by simultaneously adding a solution of 2.7 pts. sodium persulfate in 10 pts. water, and 2.0 pts. sodium disulfite in 7 pts. water. A temperature maximum of 90–100° C. is reached within 5 to 15 minutes. The reaction is continued for two hours at 80° C. 30 minutes after reaching the maximum temperature, 1 pt. of a peroxo compound in 4 pts. of water is added for postcatalysis. After a total reaction time of two hours, the mixture is neutralized by adding 190 pts. of a 25% ammonia solution so that a pH of a 10% solution adjusts to between 6 and 7. A slightly yellowish, finely dispersed, flowable emulsion is obtained which has about 45% active substance and can be diluted with water at will. The Brookfield-viscosity at 20° C. amounts to about 20,000 mPas., the number-average molecular weight amounts to about 14,280 g/mol. The product does not separate even after several weeks of storage at 50° C.

EXAMPLE 1.1

Example 1 is repeated; however, with an amount of mercaptoethanol increased to 2.5 pts. The emulsion is stable, has a viscosity of 680 mPas, and a number-average molar mass of 8,450 g/mol is measured.

COMPARATIVE EXAMPLE 1

Example 1 is repeated; however, polymerization is carried out without the hydrophilized fatty product. A slightly turbid, highly viscous solution is obtained. Then the product according to example 1.3 of DE 38 26 179 C2 corresponding in amount to Example 1 is added thereto under intense mixing. A coarse dispersion is obtained which separates after one day of storage at 50° C.

EXAMPLE 2

The procedure of Example 1 is used. 205 pts. of a fish oil sulfitate with 4.7% organically bound $SO_3$ and an iodine number of 8 are used as hydrophilized fat. The properties of this emulsion are substantially equal to those of Example 1.

COMPARATIVE EXAMPLE 2

Procedure as in Example 1.205 pts. of a fish oil that has not been pretreated are used instead of the hydrophilized fat. The product shows an unstable behavior on storage at 20° C. and 50° C., respectively.

EXAMPLE 3

Procedure as in Example 1.335 pts. of water, 145 pts. of acrylic acid, and 367 pts. of a product according to example 1.1 of DE 38 26 179 C2 (iodine number 56) are initially introduced, corresponding to a ratio of polymer to hydrophilized fat of 33.3 to 66.6%. A stable, viscous emulsion with 45% active substance results.

COMPARATIVE EXAMPLE 3

Procedure as in Example 3; however, the untreated animal fat is used instead of the hydrophilized product. The fresh polymer cannot be diluted with water, after a few days separation into two phases occurs.

EXAMPLE 4

Modifying the procedure of Example 1, 143.5 pts. of acrylic acid and 61.5 pts. of acrylamide (ratio 70:30) are used as monomers instead of 205 pts. of acrylic acid. A stable product results which tends to cream slightly at 50° C.

EXAMPLE 5

Under stirring at 30 to 70° C., 250 pts. of a paraffinic mineral oil Shell oil 8703), corresponding to a ratio of continuous phase to discontinuous oil phase of 80:20, are flown into the reaction product of Example 1 within 30 minutes. A slightly yellowish, finely flowable emulsion is obtained which has about 56% active substance and can be diluted with water at will. The product is not separated even after several weeks of storage at 50° C.

The Examples listed in the following Table differ from Example 5 in and amount of added oil phase. The stability was evaluated after three weeks of storage.

| EXAMPLE | OIL PHASE (pts.) | EMULSION STABILITY at 20° C. | at 50° C. |
| --- | --- | --- | --- |
| 6 | 250 lard oil | yes | |
| 7 | 250 Catenex SM 946[1] | yes | |
| 8 | 430 Catenex SM 946[1] | yes | |
| 9 | 250 lecithin | yes | yes |
| 10 | 430 lecithin | yes | yes |
| 11 | 670 lecithin | yes | yes |
| 12 | 250 silicone oil 350[2] | yes | yes |
| 13 | 250 paraffin C14–17 | yes | yes |

[1]paraffin oil with aromatic portions, Shell
[2]poly-(dimethyl siloxane), viscosity 350 mPas In the following Examples 14 to 16 and 19, the %-indications relate to the shaved weight of the leather used.

EXAMPLE 14
Manufacture of a Side Upper Leather
Starting material wet-blue, shaved substance 1.8–2.0 mm

| 1) Washing | 300% water 35° C. | |
| --- | --- | --- |
| | 0.5% formic acid 1:5 | |
| | 0.5% degreasing agent[3] | 15 min. |
| drain off bath | | |
| 2) Neutralization | 100% water 35° C. | |
| | 2% sodium formate | |
| | 2% SELLASOL NG gran.[4] | 45 to 60 min. |
| end pH float 4.3 to 5.1 | | |
| Leather cross-section against bromocresol green: green-blue | | |
| drain off bath | | |
| 3) Washing | 300% water 60° C. | 10 min. |
| drain off bath | | |
| 4) Retannage | 100% water 60° C. | |
| | 5% product acc. to Example 1 | 30 min. |
| 5) Dyeing | +1% SELLA FAST BROWN HH[5], 1:30 | 2 × 10 min. |
| 6) Fatliquoring | +12% anionic fatliquor combination, 1:4 | 30 min. |
| | +1% formic acid 1:5 | 30 min. |
| end pH of float 3.5 to 3.9 | | |
| drain off bath | | |
| 7) Rinsing | water 20° C. | 5 min.. |
| Horse up leather overnight, sammying, vacuum drying (80° C., 3 min.), hang up to complete drying, moisten, staking, plating. | | |

[3]nonionic surfactant combination, manufacturer Chemische Fabrik Stockhausen GmbH, tradename Tetralix SMS
[4]retanning material having a strong neutralization and buffering effect, manufacturer Ciba AG, Basel
[5]product of Ciba AG, Basel A corresponding half of leather was treated with a polymeric retanning material according to example 2 of DE 42 27 974 for comparison purposes. The leather halves were evaluated according to the principle of marks (1=very good, 6=insufficient)

| | Ex. of invention | Comparison |
| --- | --- | --- |
| softness | 2+ | 2–3 |
| levelness | 2–3 | 3–4 |
| shade | | distinctly lighter |

The assessment shows that the leather treated according to the present invention is superior to the comparative leather with regard to its leather technological properties.

EXAMPLE 15
Manufacture of Sheep-Nappa-Leather
Starting material wet-blue, shaved substance 1.0–1.2 mm

| 1) Washing | 300% water 35° C. | |
| --- | --- | --- |
| | 0.5% degreasing agent[3] | 20 min. |
| drain off bath | | |
| 2) Neutralization and retannage | 100% water 40° C. | |
| | 2% Tanhesco HN[6] | 40 min. |
| | +3% fatliquor anionic | |
| | +0.7% dispersing agent | 20 min. |
| | +2% resin tanning material | 10 min. |
| | +2.5% sodium formate | 50 min. |
| | +4.5% prod. acc. to Example 1 | 30 min. |
| | +0.8% formic acid 1:5 | 20 min. |
| drain off bath | | |
| 3) Washing | 300% water 55° C. | 10 min. |
| drain off bath | | |
| 4) Dyeing | 100% water 55° C. | |
| | 0.5% Invaderm LU[7] | 5 min. |
| | +3% SELLA FAST BROWN HH[5], 1:30 | |
| | 1% Baykanol HLX[9] | |
| | 0.25% IRAGLON ST[10] | 30 min. |
| 5) Fatliquoring | +8% anionic fatliquor, 1:4 | 60 min. |
| | +1.3% formic acid | 30 min. |
| end pH of float 3.5 to 3.9 | | |
| drain off bath | | |
| 7) Rinsing | water 25° C. | 5 min. |
| Horse up leather overnight, sammying, hang up to complete drying moisten, staking, milling, plating. | | |

[6]light-fast, chrome-containing synthetic retanning material, Ciba AG, Basel
[7]dye-affinitive, light-fast penetrating and leveling auxiliary for leather dyeing, Ciba AG, Basel
[9]anionic dyeing auxiliary, Bayer AG
[10]sequestering agent to bind disturbing heavy metal and alkaline earth ions, Ciba AG, Basel A corresponding half of a sheepskin was treated with a commercial polymeric retanning material instead of the product according to the present invention (Magnopal® 5067, Chemische Fabrik Stockhausen GmbH)

|              | Ex. of invention | Comparison |
|--------------|------------------|------------|
| softness     | 2+               | 2          |
| levelness    | 3                | 3          |
| shade        |                  | darker     |

The leather according to the present invention stands out for an improved softness.

EXAMPLE 16

Production of Waterproof Upper Leather

Starting material cattle hide, wet-blue, shaved substance 1.8–2.0 mm

| 1) Retannage I | 200% water 45° C. | |
| | 2% Chromosal B[11] | |
| | 0.5% Blancorol RC[12] | 15 min. |
| drain off bath | | |
| 2) Neutralization | 100% water 35° C. | |
| | 1% sodium formate | 30 min. |
| | +0.3% sodium bicarbonate | 60 min. |
| automatic drum run overnight | | |
| drain off bath | | |
| 3) Retannage II | 100% water 35° C. | |
| | 5% product acc. to Example 1 | 30 min. |
| 4) Dyeing | 1% SELLAFAST BROWN HH[5], 1:30 | 2 × 10 min. |
| | 3% Mimosa | |
| | 3.5% IRGATAN FB LIQ.[13] | 30 min. |
| | +1% SELLAFAST BROWN HH[5], 1:30 | 30 min. |
| drain off bath | | |
| 5) Rinsing | water 60° C. | 10 min. |
| 6) Waterproofing | 100% water 60° C. | |
| | 10% Eupilon WAS-1[14] 1:4 | 60 min. |
| | +1% formic acid 1:5 | 30 min. |
| drain off bath | | |
| 7) Washing | 300% water 35° C. | 10 min. |
| 8) Fixation | 100% water 35° C. | |
| | 0.5% formic acid 1:5 | 5 min. |
| | 3% Chromosal B[11] | 60 min. |
| Horse up leather overnight, sammying, setting out, vacuum drying (2 min., 80° C.), moisten, staking | | |

[11]basic chrome tanning material, Bayer AG
[12]chrome-containing retanning material, Bayer AG
[13]synthetic tanning material for retannage of chrome leather, Ciba AG, Basel
[14]waterproofing agent, Chemische Fabrik Stockhausen Again, a product according to example 2 of DE 42 27 974 A1 was used as comparative product. In addition to an improved softness, the product according to the present invention provides a distinctly improved hydrophobicity which can be recognized by the higher number of Maeser-flexes.

|                     | Ex. of invention      | Comparison       |
|---------------------|-----------------------|------------------|
| softness            | 2+                    | 2–3              |
| shade               |                       | slightly lighter |
| Bally-Penetrometer* | no wat. penetr. after |                  |

|                       | Ex. of invention | Comparison    |
|-----------------------|------------------|---------------|
| (10% amplitude)       | 7 hours          |               |
| Maeser-Test**         | 74,000/145,500   | 12,600/60,000 |

*Bally-Penetrometer (Lange, J., "Qualitätsbeurteilung von Leder, Lederfehler, Lederlagerung und Lederpflege", vol. 10 of "Bibliothek des Leders", Umschau Verlag 1982, pages 119–123, and "Bestimmung des Verhaltens gegenüber Wasser bei dynamischer Beanspruchung im Penetrometer", DIN 53 338, April 1976)
**Maeser Test Apparatus ("Dynamic Water Resistance of Shoe Upper Leather by the Maeser Water Penetration Tester", ASTM D 2099-70, and Lange, J., "Qualitätsbeurteilung von Leder, Lederfehler, Lederlagerung und Lederpflege", vol. 10 of "Bibliothek des Leders", Umschau Verlag 1982, p. 124).

The two mentioned test methods to determine the hydrophobicity of the leather are dynamic ones, i.e., the water absorption is determined under constant bending or crushing stress of the leather samples. The indication of the amplitude, time to water penetration, and water absorption within certain time intervals according to the Bally-penetrometer measurement provides a sound evaluation for the serviceability of a water-repellent leather finish. The set points at the amplitude of 10% must be met according to today's standards, the test periods being more than 6 hours and the water absorption below 20%. With respect to "Maeser Flexes" a value of at least 50,000 must be achieved for a good complete waterproofing.

EXAMPLE 17

Production is carried out as in Example 1; however, neutralization is carried out with an equimolar amount of sodium hydroxide solution instead of ammonia, and the product is adjusted to 30% active substance. A highly fluid and stable emulsion is obtained.

EXAMPLE 18

Production is carried out as in Example 1 7; however, the same amount of a singly hydrophilized (oxalkylated) fat according to Example 1.1 is used instead of the doubly hydrophilized (oxalkylated/sulfonated) fat according to Example 1.3 of DE 38 26 179. A highly fluid and stable emulsion is obtained.

EXAMPLE 19

Production of a Side Nappa Leather

Starting material: cattle, wet-blue, substance 1.1–1.2 mm

| 1) Retannage | 200% water, 40° C. | |
| | 2.0% Chromosal B[11] | |
| | 2.0% Blancorol RC[12] | 60 min. |
| drain off bath | | |
| 2) Neutralization | 200% water, 35° C. | |
| | 2% sodium formate | |
| | 2% SELLASOL NG gran.[4] | 30 min. |
| | +1% sodium bicarbonate (1:10) | 45 min. |
| pH float 6.6 | | |
| leather cross-section against Bromocresol green: blue | | |
| | +3% IRGATAN RL LIQ.[15] | 30 min. |
| drain off bath | | |
| 3) Washing | 300% water 60° C. | 10 min. |
| drain off bath | | |

-continued

| | | |
|---|---|---|
| 4) Fatliquoring | 100% water 60° C. | |
| | 13.6% prod. acc. to Ex. 17 | |
| | or Ex. 18, respectively | 60 min. |
| | +1.5% formic acid 1:5 | 30 min. |
| end pH of float 3.8 to 4.2 | | |
| drain off bath | | |
| 7) Rinsing | water 20° C. | 5 min. |
| Horse up leather overnight, sammying, wet-toggling, moisten, staking, milling, toggling. | | |

[15]light-fast synthetic retanning material, Ciba AB, Basel

Examination of leather properties depending on the polymers according to the present invention 17 and 18 used in fatliquoring and greasing:

| | Softness | Grain pattern |
|---|---|---|
| Polymer 17 | 2 | fine, level |
| Polymer 18 | 3 | fine, slightly unleveled |

The EXAMPLE illustrates the application technological advantages of polymers whose fat component has been hydrophilized doubly (polymer 17) by a combination of oxalkylation and sulfation/sulfonation over products having singly oxalkylated fat components (polymer 1 8).

EXAMPLE 20

Production is similar to that of Example 1, however, only 184.5 parts acrylic acid are used instead of 205 parts, and 20.5 parts sodium methallyl sulfonate are additionally used. A finely dispersed, stable emulsion having a pH of 5.5 is obtained.

COMPARATIVE EXAMPLE 4

A polymer according to example 4 of DE-OS 14 94 858 was readjusted with fish oil sulfitate (92% act. subst., iodine number 73, relative to act. subst.). A reddish-brown dispersion resulted which had a pH of 1.8, a viscosity of 3,450 mPas, and a solids content of 33.2%. The iodine number of the polymer amounted to 8.5, i.e., there was no polymerization of the double bonds of the fish oil sulfitate.

COMPARATIVE EXAMPLE 4.1

The polymer of Comparative Example 4 is adjusted to pH 5.5 with sodium hydroxide solution.

COMPARATIVE EXAMPLE 5

A polymer according to example 4 of DE-OS 14 94 858 was readjusted with fish oil sulfonate (87% act. subst., iodine number 76, relative to act. subst.). A dark brown dispersion resulted which had a pH of 1.9, a viscosity of 980 mPas, and a solids content of 32.1%. The iodine number of the polymer amounted to 9.2, i.e., the double bonds of the fish oil sulfonate had not been polymerized.

COMPARATIVE EXAMPLE 5.1

The polymer of Comparative Example 5 is adjusted to pH 5.5 with sodium hydroxide solution.

EXAMPLE 21

Example 1 is repeated using a modified monomer and fat composition. A mixture of 90 pts. acrylic acid and 10 pts. methacrylic acid is used instead of pure acrylic acid, and a fish oil sulfitate according to Comparative Example 4 is used as fat component. A brown paste-like dispersion results which has a pH of 6.1, a viscosity of >100,000 mPas, and an active substance content of 44.5%. Since the iodine number of the polymer (14.2) corresponds to the portion of double bonds of the incorporated fat component, there is no polymerization of the double bonds of the fish oil sulfitate.

EXAMPLE 22

Example 1 is repeated using a modified monomer and fat composition. A mixture of 90 pts. acrylic acid and 1 0 pts. methacrylic acid is used instead of pure acrylic acid, and a fish oil sulfate according to Comparative Example4 is used as fat component. A brown paste-like dispersion results which has a pH of 6.2, a viscosity of >100,000 mPas, and an active substance content of 42.6%. Since the iodine number of the polymer (15.0) corresponds to the portion of double bonds of the incorporated fat component, there is no polymerization of the double bonds of the fish oil sulfitate.

EXAMPLE 23

The products according to the present invention of Example 21 and 22, and the products according to Comparative Examples 4 and 5 are used in a sheep nappa formulation according to Example 15. Leather treated with the products according to the present invention stand out for a higher softness.

| Polymer | Softness |
|---|---|
| Example 1 | 2+ |
| Example 21 | 2 to 2– |
| Example 22 | 2 to 2– |
| Comparison 4 | 2–3 |
| Comparison 5 | 2–3 |

EXAMPLE 24

254 pts. deionized water, 123 pts. acrylic acid, 67 pts. of a product according to example 1.3 of DE 38 26 179 C2 (iodine number 30), 0.3 pt. mercaptoethanol, and 0.01 pt. iron(ll) sulfate are initially introduced into a three-neck glass flask equipped with stirrer and cooler. Polymerization is started at 20° C. by simultaneously adding a solution of 2 pts. sodium persulfate in 10 pts. water, and 1.5 pts. sodium disulfite in 7 pts. water. A temperature maximum of 90–100° C. is reached within 5 to 15 minutes. After reaching the maximum temperature, another 100 pts. acrylic acid are metered within 15 minutes. The reaction is continued for two hours at 80° C. 30 minutes after the end of acrylic acid metering, 1 pt. of a peroxo compound in 4 pts. of water is added for postcatalysis. After a total reaction time of two hours, the mixture is neutralized by adding 205 pts. of a 25% ammonia solution so that a pH of a 10% solution adjusts to between 6 and 7. A slightly yellowish, finely dispersed, flowable emulsion is obtained which has about 55% active substance and can be diluted with water at will. The product does not separate even after several weeks of storage at 50° C., and has a very good Glauber's salt stability.

EXAMPLE 25

Here, the monomer and fat composition of Comparative Example 5 is used under the production conditions according to the present invention.

380 pts. of deionized water, 180 pts. of methacrylic acid, 20 pts. of acrylic acid, 52 pts. of a fish oil sulfonate, and 4.3 pts. of hydroxylamine are charged into a three-neck glass flask equipped with stirrer and cooler. Polymerization is started at 20° C. by adding a solution of 60 pts. of a 3% hydrogen peroxide solution. Within 5 to 1 5 minutes, a temperature maximum of 60–700C. is achieved. 30 minutes after reaching the temperature maximum, 10 pts. of a peroxo solution are added for postcatalysis. The viscous mixture is stirred for further 90 minutes at 80° C. The product has a pH of 2.0 and is clearly soluble in water.

EXAMPLE 25.1

A portion of the product of Example 25 is adjusted to pH 6 using 50% sodium hydroxide solution. A slightly yellowish, finely divided, viscous emulsion is obtained which has about 45% active substance and can be diluted with water at will.

Examples 25 and 25.1 have the same monomer composition as Comparative Examples 5 and 5.1. However, the products according to the present invention stand out for an improved Glauber's salt stability.

EXAMPLE 26

Measuring the Glauber's salt stability: A solution of 60 g Glauber's salt (sodium sulfate) on 1 liter of solution is heated to 60° C., subsequently the test substance is stirred in so that a 20%-wt. emulsion (relative to product) results. After that, the solution is adjusted to pH 3.5 to 4.0 with formic acid, if necessary, and after cooling to room temperature the stability of the emulsion is assessed visually.

This test is particularly important when the treatment floats in leather manufacture contain larger amounts of salt. If the emulsion is insufficiently stable, these salt quantities may result in the fact that the emulsion coagulates and becomes ineffective. Leather dyes frequently contain large amounts of Glauber's salt as cutting salts.

Assessment:

| Polymer | Stability |
| --- | --- |
| Example 1 | ++ |
| Example 17 | ++ |
| Example 18 | ++ |
| Example 24 | ++ |
| Example 25 | + |
| Example 25.1 | ++ |
| Comparison 4 | − |
| Comparison 4.1 | + |
| Comparison 5 | − |
| Comparison 5.1 | + |
| Fish oil sulfitate | −− |

++ very fine emulsion, still stable even after 7 days
+ stable emulsion; however, tends to cream after 2 hours
− unstable emulsion, separates after 10 minutes
−− does not form o/w-emulsion but w/o-emulsion the surprising result of this test lies in the fact that the fat components according to the products of the present invention which as such are not emulsifyable in this solution are emulsified in water to a better extent than those according to DE 14 94 858.

What is claimed is:

1. A process for the production of an aqueous polymer dispersion, comprising:

(a) introducing into a reactor an aqueous dispersion or solution containing at least one hydrophilized fat/oil selected from the group consisting of vegetable fats/oils, animal fats/oils and technical fats/oils and combinations thereof and the total amount or a predominate amount of (a) a monoethylenically unsaturated monomer containing partially or completely neutralized acid groups and optionally (b) additional copolymerizable monomers, wherein the ratio of monomers (a) and (b) to hydrophilized fats/oils ranges from 20:80 to 80:20 and optionally a chain transfer agent;

(b) initiating polymerization of the monomers by mixing a water-soluble redox system into the monomer containing polymerization medium;

(c) heating the polymerization medium adiabatically; and (d) adding any remaining monomer to the polymerization medium to complete the polymerization process.

2. The process according to claim 1, wherein additional initiator is added to the polymerization medium after adiabatic heating of the medium.

3. The process according to claim 1, which further comprises continuing polymerization isothermally after reaching the maximum temperature resulting from adiabatic heating of the polymerization medium.

4. The process according to claim 1, wherein at least 55 wt. % of the total amount of monomers (a) and optional monomers (b), as a predominant amount, are initially introduced into said reactor.

5. The process according to claim 4, wherein said predominant amount of monomers (a) and (b) is at least 65 wt. % of monomers to be polymerized.

6. The process according to claim 1, wherein the amounts of monomers (a) and (b) are from 30 to 100 wt. % of monomers (a) with 0 to 70 wt. % of monomers (b), with the monomers (a) and (b) constituting 100% of monomers that are polymerized.

7. The process according to claim 6, wherein the amount of monomer (a) ranges from 60 to 100 wt. % and the amount of monomer (b) ranges from 0 to 40 wt. %.

8. The process according to claim 1, wherein said monomer (a) is selected from the group consisting of acrylic acid, methacrylic acid, allyl sulfonic acid, methallyl sulfonic acid, 2-acrylamido-2-methylpropylsulfonic acid and combinations thereof.

9. The process according to claim 1, wherein said hydrophilized fat or oil has an iodine number of less than 40 as determined by the procedure of DIN 53241, Part 1.

10. The process according to claim 9, wherein said iodine number is less than 20.

11. The process according to claim 1, wherein said fat/oil component(s) is hydrophilized by sulfonation, sulfitation, sulfation or alkoxylation of a fat/oil.

12. The process according to claim 1, wherein said fat/oil is hydrophilized by a combination of oxalkylation and sulfation, sulfonation or sulfitation.

13. The process according to claim 1, wherein the acid groups of said monoethylenically unsaturated monomer (a) are partially neutralized prior to, during or subsequent to polymerization.

14. The process according to claim 1, wherein the polymerization reaction is conducted for 1 to 10 hours.

15. The process according to claim 1, wherein the polymerization of monomers is initiated at a temperature ranging from 0 to 40° C.

16. The process according to claim 15, wherein said temperature ranges from 10–30° C.

17. The process according to claim 1, wherein the polymerization medium is adjusted to a pH value within the range of 5 to 9 after termination of the polymerization.

18. The process according to claim 17, wherein the pH of the polymerization medium is adjusted to a value within the range of 6 to 7 by addition of aqueous ammonia or aqueous alkali.

19. The process according to claim 1, wherein, subsequent to polymerization, at least one hydrophobic compound is mixed into the polymerization medium in an amount of up to 60 wt. % relative to the weight of the polymer dispersion obtained from polymerization.

20. The process according to claim 19, wherein said amount of hydrophobic compound is at most 40 wt. % relative to the weight of the polymer dispersion.

21. The process according to claim 19, wherein the hydrophobic compound is a member selected from the group consisting of polysiloxanes, vegetable fats/oils, animal fats/oils and technical fats/oils.

22. An aqueous polymer dispersion prepared by the polymerization process of claim 1.

23. The aqueous polymer dispersion according to claim 22, which further comprises at least one additional hydrophobic compound added thereto in emulsified form in an amount of up to 60 wt. % relative to the weight of the polymer dispersion.

24. The aqueous polymer dispersion according to claim 23, wherein the amount of said at least one additional hydrophobic compound added is an amount of up to 40 wt. %.

25. The aqueous polymer dispersion according to claim 23, wherein said hydrophobic compound is selected from the group consisting of polysiloxanes, vegetable fats/oils, animal fats/oils and technical fats/oils.

26. A method of emulsifying hydrophobic compounds, comprising:

emulsifying a hydrophobic compound with the aqueous polymer dispersion according to claim 22.

27. A method of producing and processing leather or furs, comprising:

applying to said leather or furs the aqueous polymer dispersion according to claim 22.

* * * * *